Patented May 7, 1940

2,200,057

UNITED STATES PATENT OFFICE 2,200,057

CHEMICAL PROCESS AND NEW CATALYSTS THEREFOR

Albert S. Carter and Frank Willard Johnson, Wilmington, Del., assignors to E. I. du Pont de Nemours & Company, Wilmington, Del., a corporation of Delaware No Drawing. Application May 26, 1938, Serial No. 210,159

14 Claims. (Cl. 260—678)

This invention relates to a process for the manufacture of non-benzenoid acetylene polymers. More particularly it relates to the catalytic polymerization of acetylene to vinylacetylene, divinylacetylene and related compounds. Still more particularly, it relates to catalysts specially adapted to this polymerization process.

In U. S. Patent 1,811,959, Julius A. Nieuwland describes catalysts, capable of polymerizing acetylene to various vinylacetylenes, consisting of aqueous solutions of cuprous chloride in combination with salts of ammonia, tertiary amines, sodium, or potassium. The ammonium salts, which were the preferred embodiment of the Nieuwland invention, were particularly used in a process for the manufacture of vinylacetylene described by Carter and Downing in U. S. Patent 2,048,838. Numerous patents have appeared on various features of the process for the polymerization of acetylene utilizing the Nieuwland type catalyst, and in several, especially U. S. 1,971,656, British 445,358, 451,442, French 792,642, 792,917 and British 438,548, the use of catalysts consisting of alkali metal halides, especially NaCl and KCl, has been suggested as a substitute for the nitrogen bases in conjunction with cuprous chloride.

It is an object of this invention to provide new catalysts for the polymerization of acetylene to non-benzenoid polymers of acetylene. A further object is to provide an improved method for polymerizing acetylene to non-benzenoid polymers. A more specific object is to provide a more efficient process for polymerizing acetylene. Another object is to provide catalysts which have improved efficiency from the standpoint of their capacity to polymerize acetylene to non-benzenoid polymers. Other objects will appear hereinafter.

Previous investigation has shown that altho sodium chloride may be substituted for ammonium chloride, as stated in U. S. 1,811,959 and again in British 438,548, the catalysts so produced are inferior to those obtained with the nitrogen bases. All of the prior art has dealt with potassium and sodium chlorides as equivalents, and none of the previous inventors has given an example of the use of potassium chloride. It has been assumed by analogy with other metallic halides of the first group metals to be an equivalent.

It is an unexpected discovery, therefore, to find that mixtures of cuprous and potassium chlorides within certain concentration limits are not the equivalents of cuprous and sodium chloride mixtures, but instead, are not only superior to sodium chloride, but are also superior to the previously preferred mixtures containing ammonium chloride and that the above objects may therefore be accomplished by polymerizing acetylene in the presence of certain mixtures of cuprous and potassium chlorides. More particularly, it has been found that superior catalysts for the manufacture of vinylacetylene, divinylacetylene, 1,3-hexadien-5-yne and 1,3,7-octatrien-5-yne by polymerization of acetylene consist of non-alkaline solutions of cuprous and potassium chlorides in water. This basic composition may be modified in any of the previously disclosed manners; for example, it is preferable to operate the solution in the presence of finely divided copper to insure the reduction of the copper chloride to the cuprous state; it is also preferable to maintain a slight acidity of hydrochloric acid in the catalyst mixture at all times; and it is also possible to use equivalents such as cupric chloride in place of cuprous chloride, providing suitable means to insure complete reduction of the cupric chloride before use in the polymerization process. These modifications may or may not be included in the process, as will be illustrated in the following examples, but certain selected concentrations of cuprous and potassium chlorides in water are always used to obtain the new catalysts of superior properties.

The following examples which more fully illustrate the use of the catalyst and the high catalytic efficiency resulting therefrom, are given for the purpose of illustration alone, and accordingly they are not intended to be construed as limiting the scope of the invention.

Example I

A copper reaction vessel of 4500 cc. capacity (length 37.2 cm. and diameter 12.4 cm.) is supported in a thermostatically controlled bath and is arranged with a horizontal agitator operated at 180 R. P. M., a gas inlet at one end and a gas outlet at the opposite end. A catalyst consisting of 1120 gms. of cuprous chloride, 842 gms. of potassium chloride, 36 gms. of 37% hydrochloric acid and 786 gms. of water was charged into this vessel; 100 gms. of copper powder was added and the mixture was aged under nitrogen while agitated at a temperature of 65° C. for several hours to insure the reduction of copper to the cuprous state. At the end of this period, the acidity of the mixture was adjusted to pH 0.5 by addition of hydrochloric acid, the pH being measured by means of a glass electrode in the usual manner. When properly acidified, acetylene was swept thru the reaction vessel to displace nitrogen while the catalyst mixture was continuously agitated. Continuing the agitation, the acetylene rate was adjusted to 13.6 cu. ft. per hour, passing the effluent gas mixture thru an ice-cooled condenser in which water was separated and returned to the catayist, thence thru a drying tube packed with calcium carbide, and finally thru condensers cooled to −80° C. in which the products and part of the acetylene were condensed. The condensate was analyzed periodically for chlorine and an equivalent weight of hydrochloric acid was continuously added to the catalyst to replace that removed as chlor-compounds. Samples of the condensate were collected over hourly periods and were freed of the acetylene by refluxing under a suitable column and dephlegmator. The weight of polymers obtained after removal of acetylene corresponded to a polymerization of 5.6 gms. of acetylene per 100 gms. of cuprous chloride per hour, or 40.5 gms. per 1000 cc. of catalyst per hour.

Example II

Example I was repeated, but the condensate was continuously fed into a reflux column from which acetylene was vented into the uncondensed gas stream, leaving the acetylene polymers behind as the still residue. The acetylene refluxed off of the column combined with that which was uncondensed was circulated by means of a small blower and returned to the catalyst tube together with fresh gas in sufficient quantity to replace that which had reacted. The production of polymers was the same as that obtained in Example I but by recycling the acetylene, it was completely converted to reaction products, primarily vinyl- and divinylacetylene.

Example III

Two experiments were run in the manner of Example I, but in one case, the catalyst was composed of a mixture containing KCl and in the second, an equal volume of catalyst was prepared containing NaCl. The results of this comparison are tabulated below:

|  | Catalyst | |
| --- | --- | --- |
|  | 487 g. NaCl<br>824 g. $Cu_2Cl_2$<br>1025 g. $H_2O$<br>100 g. 37% HCl | 473 g. KCl<br>838 g. $Cu_2Cl_2$<br>1010 g. $H_2O$<br>100 g. 37% HCl |
| Production:<br>Gms./100 g. $Cu_2Cl_2$/hr<br>Gms./liter of catalyst/hr | 2.5<br>13.3 | 6.3<br>33.9 |

This example is characteristic of the unexpected efficiency of the KCl catalyst as compared with another alkali metal chloride, namely, sodium chloride.

Example IV

In the manner of Example I, various solutions of cuprous and potassium chlorides in water in which the molecular ratio of KCl and $Cu_2Cl_2$ was 1.0 were tested. The following results show the approximate behavior of the solutions, tho variations in production from run to run are likely to result from slight variations in the pH of the catalyst solution.

| Catalyst: | | | | |
| --- | --- | --- | --- | --- |
| Percent water | 60 | 45 | 30 | 15 |
| Percent $Cu_2Cl_2.KCl$ | 40 | 55 | 70 | 85 |
| Production: | | | | |
| Gms./100 g. $Cu_2Cl_2$/hr | 1.7 | 3.2 | 4.0 | 1.7 |
| Gms./liter of catalyst/hr | 6.5 | 19.8 | 37.5 | 23.3 |

Example V

In the manner of Example IV, the molar ratio KCl/$Cu_2Cl_2$ of 1.5 was tested:

| Catalyst: | | | | |
| --- | --- | --- | --- | --- |
| Percent water | 60 | 45 | 30 | 20 |
| Percent $Cu_2Cl_2.1.5KCl$ | 40 | 55 | 70 | 80 |
| Production: | | | | |
| Gm./100 g. $Cu_2Cl_2$/hr | 4 | 6.3 | 6.4 | 5.27 |
| Gm./liter of catalyst/hr | 13.6 | 33.9 | 52.3 | 55.5 |

Example VI

In the manner of Example IV, the molar ratio KCl/$Cu_2Cl_2$ of 2.0 was tested:

| Catalyst: | | | | |
| --- | --- | --- | --- | --- |
| Percent water | 60 | 45 | 30 | 15 |
| Percent $Cu_2Cl_2.2KCl$ | 40 | 55 | 70 | 85 |
| Production: | | | | |
| Gm./100 g. $Cu_2Cl_2$/hr | 5.7 | 7.7 | 6.1 | 2.3 |
| Gm./liter of catalyst/hr | 17.4 | 37.7 | 44.2 | 24.1 |

Example VII

In the manner of Example IV, the molar ratio KCl/$Cu_2Cl_2$ of 3.0 was tested:

| Catalyst: | | | |
| --- | --- | --- | --- |
| Percent water | 60 | 45 | 30 |
| Percent $Cu_2Cl_2.3KCl$ | 40 | 55 | 70 |
| Production: | | | |
| Gms./100 g. $Cu_2Cl_2$/hr | 7 | 4.1 | 2.3 |
| Gms./liter of catalyst/hr | 17.2 | 15.7 | 13.5 |

The results tabulated in these examples illustrate the behavior of the catalyst and emphasize the characteristic increase in production to a maximum at a definite composition. In general, it is desirable to maintain a low KCl/$Cu_2Cl_2$ ratio, using catalysts containing 15 to 45% of water based on the total weight of water, KCl, and $Cu_2Cl_2$. Selecting the range of peak efficiency of these catalysts, the following limits of compositon, which are given in percentages by weight, based on the total weight of water, KCl, and $Cu_2Cl_2$, are preferred:

|  | Per cent |
| --- | --- |
| Water | 15 to 45 |
| $Cu_2Cl_2$ | 30 to 60 |
| KCl | 15 to 36 | particularly those of the above catalysts with KCl/$Cu_2Cl_2$ ratios (molecular) of 1.0 to 3.0, and within these ranges, catalysts containing 25 to 35% of water with KCl/$Cu_2Cl_2$ ratios (molecular) of 1.0 to 2.5, equivalent to a $Cu_2Cl_2$ concentration of 33 to 57% and a KCl concentration of 18 to 32%. The catalyst compositions containing 30% water, 19 to 30% KCl and 40 to 51% $Cu_2Cl_2$ are particularly selected; within this group, the most desirable catalysts contain 25 to 30% KCl and 40 to 45% $Cu_2Cl_2$.

Maximum production is obtained from catalysts which contain a definite hydrochloric acid acidity, but this is optional. Owing to the variabilty of cuprous chloride, varying quantities of acid are required to produce a definite acidity in the catalyst. The preferred method of acidity control is illustrated in Example I. It has been found that maximum production is obtained if the catalyst is operated at the acidity which results in a drop in pH from approximately 4 to 5 to a pH of 1 or less when measured on the catalyst before saturation with acetylene. After the addition of acetylene, the pH can no longer be measured and interpreted satisfactorily. For this reason, the acidity is controlled during operation by returning an amount of HCl to the catalyst equivalent to all that is removed in the form of chloro-compounds in the various products.

The temperature of operation may be 25 to 100° C. depending upon the type of apparatus and the manner of handling the catalyst. For the reactor of the design described in the examples an operating range of 65 to 75° C. is preferred. Likewise, the pressure of operation may vary from atmospheric pressure to the limit of safety in handling acetylene, thus dilute acetylene may be operated at a much higher pressure than pure gas.

The use of this catalyst contemplates the usual types of reactors elsewhere described for the manufacture of acetylene polymers, namely, batch processes, the horizontal-type reactor illustrated in the examples, whether cyclic with respect to unreacted acetylene or non-cyclic, also reactors in which the catalyst is circulated, absorbing acetylene in one unit and stripping in a second either by heat alone or by means of an inert gas such as steam. The application contemplates the use of dilute acetylene in any of these processes, particularly the circulating catalyst type, as well as concentrated gas, and in the application of dilute acetylene, the use of higher pressures, such as 100 to 250 lbs. per square inch is desirable.

In comparison of catalysts containing KCl with those containing $NH_4Cl$, it is found that equal volumes of catalysts of equivalent fluidity produce at least 30% more polymer when composed of KCl. An important feature commercially is the volume efficiency of the catalysts, for a large cost item is the investment in equipment. Increased volume efficiency of the catalysts results in greater production per unit of equipment size, therefore, catalysts containing these selected concentrations of potassium chloride are particularly valuable.

It is apparent that many widely different embodiments of this invention may be made without departing from the spirit and scope thereof and therefore it is not intended to be limited except as indicated in the appended claims.

We claim:

1. A process for the polymerization of acetylene to non-benzenoid hydrocarbons of higher molecular weight which comprises bringing the acetylene into contact with an aqueous catalyst comprising from about 15 to about 45 parts water, from about 30 to about 60 parts cuprous chloride and from about 15 to about 36 parts potassium chloride, the said three constituents being present in such amounts within the ranges that the total number of parts of the three is equal to about 100.

2. A process as described in claim 1, further characterized in that finely divided free copper is present in the catalyst and in that the catalyst is initially adjusted to a pH not greater than about 1.0 and maintained at this acid content.

3. A process as described in claim 1, further characterized in that the ratio $KCl/Cu_2Cl_2$ (molecular) is in the range of about 1.0 to about 3.0.

4. A process as described in claim 1, further characterized in that catalyst comprises from about 25 to about 35 parts water and in that the ratio $KCl/Cu_2Cl_2$ (molecular) is in the range of about 1.0 to about 2.5.

5. A process as described in claim 1, further characterized in that catalyst comprises from about 25 to about 35 parts water, in that the ratio $KCl/Cu_2Cl_2$ (molecular) is in the range of about 1.0 to about 2.5, and in that the catalyst is initially adjusted to a pH not greater than about 1.0 and maintained at this acid content.

6. A process as described in claim 1, further characterized in that catalyst comprises from about 25 to about 35 parts water, in that the ratio $KCl/Cu_2Cl_2$ (molecular) is in the range of about 1.0 to about 2.5, and in that finely divided free copper is present with the catalyst.

7. A process as described in claim 1, further characterized in that catalyst comprises from about 25 to about 35 parts water, in that the ratio $KCl/Cu_2Cl_2$ (molecular) is in the range of about 1.0 to about 2.5, in that finely divided free copper is present in the catalyst and in that the catalyst is initially adjusted to a pH not greater than about 1.0 and maintained at this acid content.

8. A process as described in claim 1, further characterized in that the catalyst comprises about 30 parts water, about 19 to about 30 parts potassium chloride, and about 40 to about 51 parts cuprous chloride, in that finely divided free copper is present in the catalyst and in that the catalyst is initially adjusted to a pH not greater than about 1.0 and maintained at this acid content.

9. A process as described in claim 1, further characterized in that the catalyst comprises about 30 parts water, about 25 to about 30 parts potassium chloride, and about 40 to about 45 parts cuprous chloride, in that finely divided free copper is present in the catalyst and in that the catalyst is initially adjusted to a pH not greater than about 1.0 and maintained at this acid content.

10. An aqueous catalyst for the polymerization of acetylene to non-benzenoid hydrocarbons of higher molecular weight which comprises from about 15 to about 45 parts water, from about 30 to about 60 parts cuprous chloride and from about 15 to about 36 parts potassium chloride, the said three constituents being present in such amounts within the ranges that the total number of parts of the three is equal to about 100.

11. A catalyst as described in claim 10, further characterized in that the ratio $KCl/Cu_2Cl_2$ (molecular) is in the range of about 1.0 to about 3.0.

12. A catalyst as described in claim 10, further characterized in that the catalyst comprises from about 25 to about 35 parts water and in that the ratio $KCl/Cu_2Cl_2$ (molecular) is in the range of about 1.0 to about 2.5.

13. A catalyst as described in claim 10, further characterized in that the catalyst contains about 30 parts water, from about 19 to about 30 parts potassium chloride, and from about 40 to about 51 parts $Cu_2Cl_2$.

14. A process for the polymerization of acetylene to non-benzenoid hydrocarbons of higher molecular weight which comprises passing acetylene over an agitated aqueous catalyst initially adjusted to a pH of about 0.5 and maintained at this acid content, and comprising copper powder, about 30 parts water, from about 25 to about 30 parts potassium chloride, and from about 40 to about 45 parts cuprous chloride, the cuprous chloride and potassium chloride being present in such amounts within the range that the total number of parts of the two is equal to about 70, separating the water and unreacted acetylene from the effluent gases, returning the water to the catalyst, and recycling the unreacted acetylene.

ALBERT S. CARTER.
F. WILLARD JOHNSON.